J. DILLEN.

Safety Derrick-Lamps.

No. 5,114. Reissued Oct. 29, 1872.

Witnesses.

Chas. H. Poole

Edwin A. Stevens.

Inventor.

Jonathan Dillen

By J. B. Woodruff & Son

Attorneys of Record

AM. PHOTO-LITHOGRAPHIC CO. N.Y. (OSBORNE'S PROCESS.)

UNITED STATES PATENT OFFICE.

JONATHAN DILLEN, OF PETROLEUM CENTRE, PENNSYLVANIA.

IMPROVEMENT IN SAFETY DERRICK-LAMPS.

Specification forming part of Letters Patent No. 102,663, dated May 3, 1870; reissue No. 5,114, dated October 29, 1872.

*To all whom it may concern:*

Be it known that I, JONATHAN DILLEN, of Petroleum Centre, in the county of Venango and State of Pennsylvania, have invented certain new and useful Improvements in Safety Derrick-Lamps; and the following is a full and clear and exact description of the same, reference being had to the accompanying drawing making a part of this specification.

My invention relates to lamps which are used in the open air without a glass or other protection from the elements. My improved lamp is designed to obviate explosion, and is specially adapted for use in the oil regions, to give light in and about the derricks and other machinery of oil-wells, where the explosion of a lamp is attended with great danger by causing destructive conflagration and consequent loss of life and property. The invention consists in providing lamps the body and wick-tubes of which are made in one piece, of malleable iron or other strong and durable metal, formed by casting in molds, and in providing such lamps with gas-tight lids or covers, and with ventilating-tubes for the escape of the gas generated in the body of the lamp, all as hereinafter more fully set forth.

Figure 1:
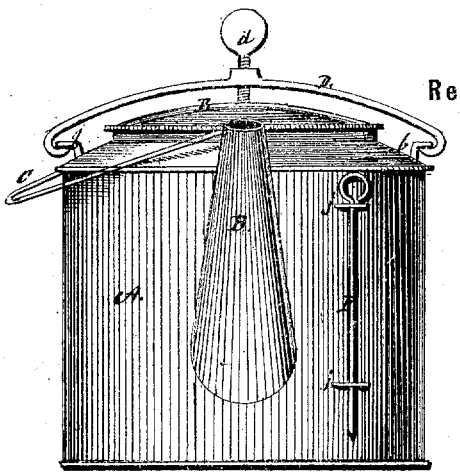
Figure 2:
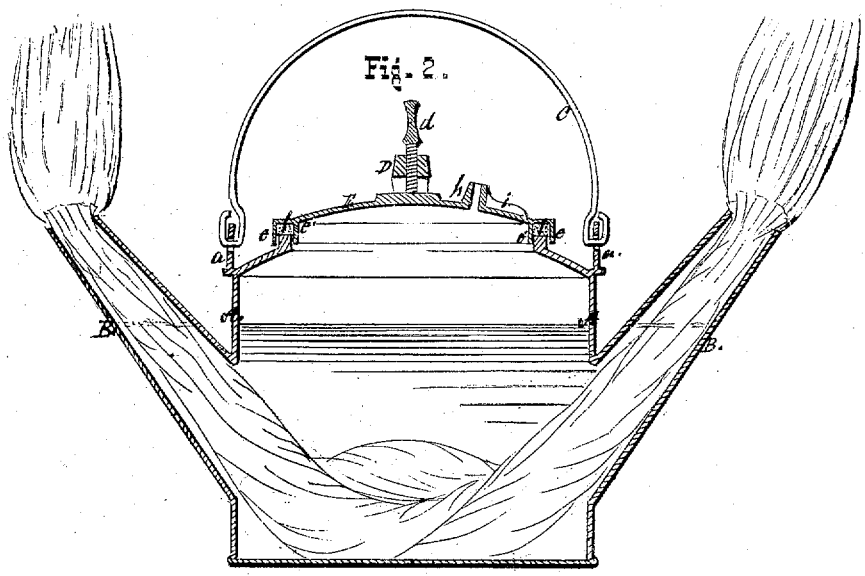

In the accompanying drawing, Figure 1 is an exterior view of my improved lamp complete. Fig. 2 is a sectional view, showing the interior of the lamp, method of securing the lid, ventilating device, &c.

A represents the body of the lamp. B B are the wick-tubes. *a a* are ears for the reception of the ends of the bail C, and *b b* are projections or lugs formed on the sides of the body A. D is a yoke or clamp-bar, the ends of which hook onto the lugs *b b*. It is passed over the lid or cover E, and provided with a thumb-screw, *d*, at its center, for the purpose of securing and holding the lid in position. The lid or cover E is constructed with a double rim, *e e*, in or between which is secured a rubber gasket, *f f*, or other elastic packing, which prevents the escape of gas from the interior of the lamp when the lid is secured in position. The lid may be made crowning or dished and with an increased thickness of metal toward the center, so as to give increased strength at the point where the clamp-screw *d* bears upon it. It is also provided with a small vent-hole or tube, *h*, which is protected by a shield, *i*, the object of this vent and shield being to allow the gas generated within the lamp to escape gradually in small volume and thereby prevent explosion of the lamp. On the outside of the body of the lamp two or more loops or eyes, *j j*, may be cast for receiving and holding a rod or hook, F, or any instrument suitable for trimming the lamp.

I do not limit myself to a lamp constructed exactly like that herein shown and described, as, with other modifications, it will be obvious that any convenient number of wick-tubes may be used.

By my invention I have provided a lamp having the body and wick-tubes cast in one piece from strong tenacious metal, and with a lid of like material secured thereto by a gas-tight joint and provided with a vent, the whole constituting a lamp capable of resisting the pressure of the gas generated within it, and which permits of its escape in such small volume as will insure its gradual combustion should it become ignited, thereby obviating explosion and the great danger of extensive conflagrations resulting therefrom, as before set forth.

I therefore claim as my invention—

1. A lamp constructed substantially as described, having the body A and wick-tubes B cast in one piece, from malleable iron or like tenacious metal, and a gas-tight lid or cover, E, and a vent, *h*, for the purpose specified.

2. The lid E having the double rim *e e* and rubber packing *f*, in combination with the yoke D, screw *d*, and lamp A, substantially as and for the purpose specified.

3. The lamp A, lid E, vent *h*, yoke D, screw *d*, and bail *c*, as constructed, for the purpose specified.

JONATHAN DILLEN.

Witnesses:

A. B. RICHMOND,

ROE REISINGER.